Jan. 13, 1942.  T. E. MEAD  2,269,727
MECHANISM FOR HOLDING WORK ON DRILL PRESSES
Filed Oct. 25, 1941  2 Sheets-Sheet 1
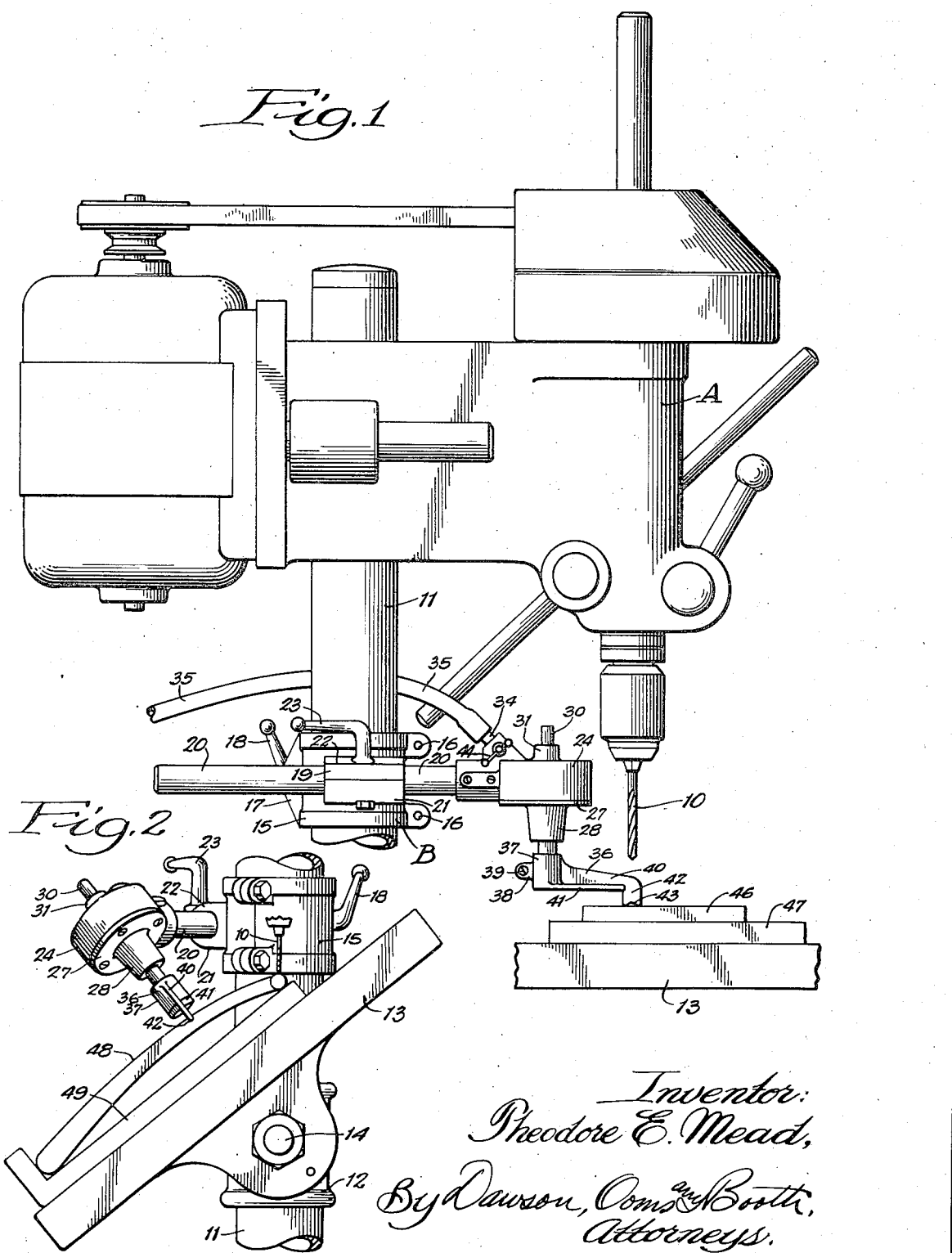
Inventor:
Theodore E. Mead,
By Dawson, Ooms and Booth,
Attorneys.

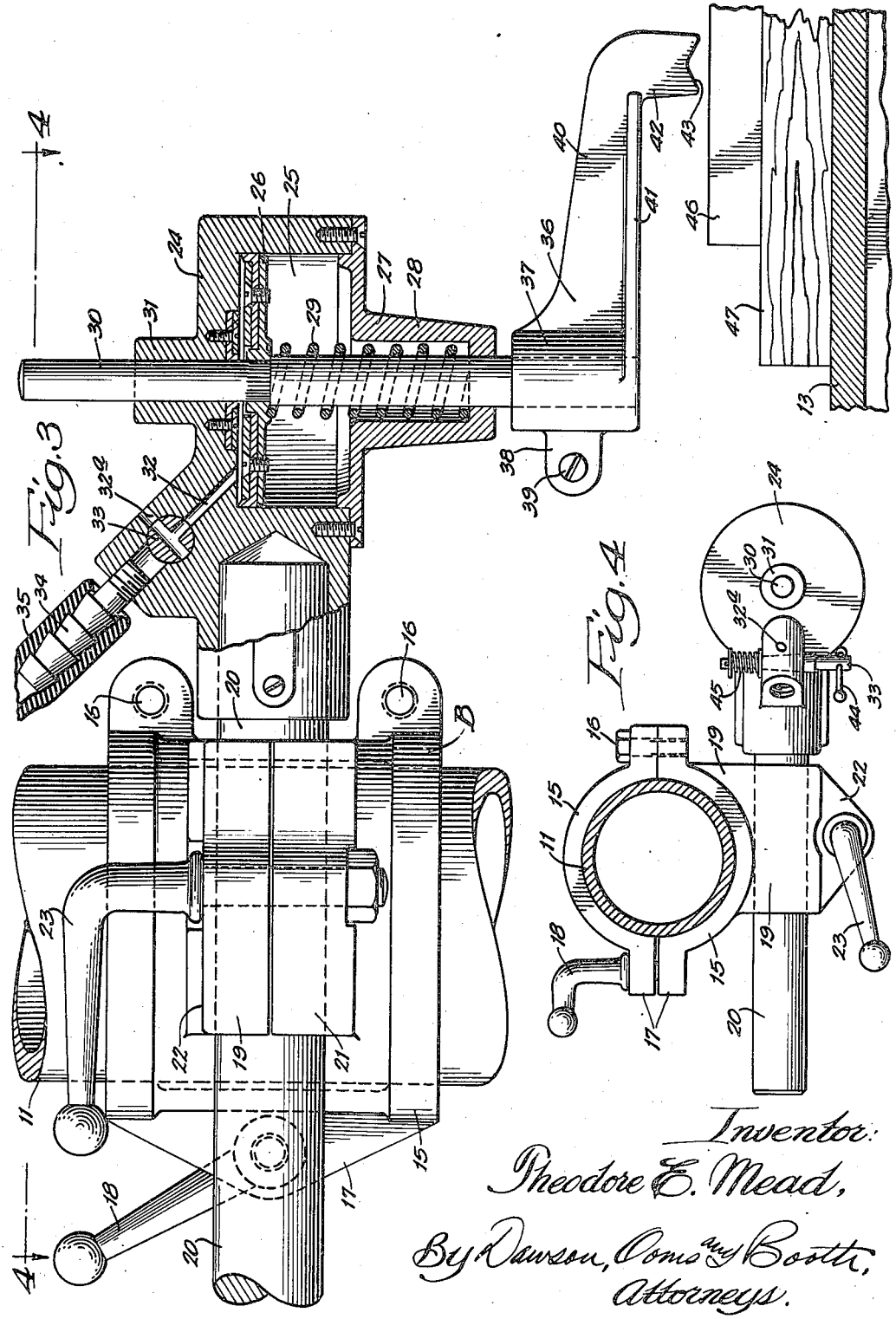

Patented Jan. 13, 1942

2,269,727

UNITED STATES PATENT OFFICE 2,269,727

MECHANISM FOR HOLDING WORK ON DRILL PRESSES

Theodore E. Mead, Wilmette, Ill.

Application October 25, 1941, Serial No. 416,432

7 Claims. (Cl. 77—63)

This invention relates to mechanism for holding work on a drill press, and more particularly to mechanism operable together with the work table of a press to maintain an object to be drilled in the desired position for the drilling operation.

An object of the invention is to provide effective means for exerting a predetermined pressure upon an object being engaged by a driven tool to maintain the same in the desired position. A further object is to provide means for moving holding mechanism through a variety of positions for maintaining the work to be operated upon in the desired angular position with respect to the operating tool. A further object is to provide a drill press apparatus equipped with a movably mounted work table and a movably mounted holding mechanism, the table and the mechanism being movable in different directions to provide for a cooperative engagement between the mechanism and the material being held by the table to support the same in any of a multitude of possible positions. Other specific objects and advantages will appear as the specification proceeds.

The invention is illustrated, in a preferred embodiment, by the accompanying drawings, in which—

Figure 1 is a broken side view in elevation of apparatus embodying my invention; Fig. 2, a broken front view illustrating the operation of the holding mechanism upon a piece being held at a difficult angle for a drilling operation; Fig. 3, an enlarged broken side view in elevation, a portion of the apparatus being shown in longitudinal section; and Fig. 4, a transverse sectional view, the section being taken as indicated at line 4 of Fig. 3.

In the illustration given, A designates a drill press; and B, a holding mechanism cooperating therewith.

The drill press A may be of any suitable type and a detailed description is believed unnecessary. The usual mechanism is provided for driving the drill 10. The driving mechanism is carried by a vertical shaft or standard 11. Upon the shaft 11 is mounted a sleeve member 12 which is, as usual, clamped into position at any desired point along the standard 11. A work table 13 is rotatably mounted upon the sleeve 12 by means of pin 14.

The pressure holding mechanism B is also slidably carried by the standard 11 above the sleeve 12 which supports the working table 13. The mechanism B includes a pair of clamping members 15 which are secured on one side along overlapping flanges by the bolt 16, and on the other side the overlapping flanges 17, which are interiorly perforated and threaded, are secured together by a threaded clamping member 18.

Integrally formed with one of the clamping members 15 is a laterally-extending boss 19 having a hole therein adapted to receive a horizontally-shiftable shaft 20. A mating boss 21 extends below boss 19 and is also provided with a semi-circular opening adapted to receive the shaft 20. The ends of the bosses 19 and 21 are extended to form overlapping flanges 22 which are perforated and threaded and which receive a clamping threaded handle member 23. By the means described, the shaft 20 is releasably secured in position upon the standard 11.

Upon the forward end of the shaft 20 is mounted a power cylinder casing 24. The cylinder preferably comprises a casting providing a chamber 25 adapted to receive the piston 26. The lower end of the chamber 25 is closed by a removable cap 27 which provides a guide extension 28. A spring 29 is received within the extension 28 and normally urges the piston 26 in an upward direction. Secured to the piston 26 is a stem or plunger 30, the upper end of which is guided within the boss 31. Communicating with the chamber 25 at the upper end thereof is a fluid inlet port 32 controlled by a rotatable two-way plug valve 33. To the passage 32 a tube connector 34 is secured, and from the connector 34 extends a tube 35 by means of which an operating fluid may be brought to the chamber.

To the lower end of the plunger 30 is secured a pressure-applying member 36. This member has a recessed hub portion 37 receiving the plunger 30 and is secured thereto by integral clamping ears 38. The ears 38 are drawn together by means of the screw 39.

The pressure-applying member 36 may be made in a variety of different forms and shapes. For the purpose of illustration, a single shape is shown. In the form illustrated, the member is provided with a vertical flange 40, and on its base a horizontal flange 41, both flanges serving to reinforce the structure. At the forward tip end, the flange 40 is turned downwardly to form a narrow pressure-applying tip 42. If desired, the bottom of the tip may be provided with a V-recess 43.

In order to operate the plug valve 33, a handle 44 is extended through one end of the plug, as shown in Fig. 4. A spring 45 is employed to maintain the conical plug with the openings thereof in proper alignment with the bore of passage 32.

In the showing in Fig. 3, the piece of work being operated upon is indicated by the numeral 46, the work being supported by a wooden block 47 upon the drill press table 13. In the showing in Fig. 2, the piece of work is indicated by the numeral 48 and it is supported in the position shown by an angular support member 49.

Operation

In the operation of the device, a piece of work is placed upon the table 13, and if desired the table is rotated or moved vertically to the position desired. The crank handle 23 is then turned to free the slidable shaft 20 which is advanced or retracted to the desired position. At the same time, the shaft 20 may be rotated to bring the pressure member 40 to bear at the desired angle against the work. When the pressure point 42 is above the work and at the place desired, the valve handle 44 is turned so as to connect the passage 32 with the pressure fluid, thus forcing the piston 26 downwardly and thereby the plunger 30 and the pressure foot member 40. The pressure may be extremely heavy so as to hold the work with such firmness and rigidity that it cannot move during the drilling operation while at the same time the member 40 may stop at the point where it engages the work. In other words, there is considerable latitude as to the point where the pressure member 40 may stop. It may stop when the plunger has moved just a slight distance or after the plunger has moved a distance representing almost the entire height of the pressure chamber 25. After the drilling operation is completed, the valve handle 44 is turned so as to disconnect the passage 32 with the source of pressure and allowing the compressed air or other pressure fluid to escape through the opening 32ª. At the same time, the spring 29 which had been compressed during the downward movement of the stem 30 now urges the piston 26 back to the inward position shown in Fig. 3.

The structure described permits a great variety of movements so that drilling can be readily accomplished at extremely difficult angles and upon pieces of work of highly irregular shapes. The table may be manipulated to various positions and through various angles, and similarly the pressing member 40 may be moved as upon a universal joint to cooperate with the table in placing the pressure upon the piece of work at the desired point and angle. The plunger 30 and piston 26 are also free to rotate, permitting the swinging of the pressure foot 40 to any desired rotative position. The flexibility of the operation is illustrated in Figure 2 where the piece of work is one of a difficult shape and the drilling is accomplished at an almost inaccessible point.

In operation, the support member 15 is shifted vertically, and if desired rotated upon the standard 11 in cooperation with the shifting and rotating of the means for supporting the table 13. In addition, the shaft 20 permits rotating of the pressure end and the movement of it in a forward and backward direction, thus further increasing the flexibility of the holding operation.

While in the foregoing specification, I have set forth certain details and specific structures, it will be understood that such details and structures may be varied widely by those skilled in the art without departing from the spirit of my invention.

I claim:

1. In combination with a drill press having a standard, a work table shiftably mounted thereon, a support longitudinally shiftable on said standard toward and away from said table, a pressure fluid power cylinder carried by said support, a fluid conduit connected to said cylinder, said cylinder being provided with a piston and a plunger secured thereto, and a pressure member carried by said plunger and movable thereby toward and away from said table.

2. In combination with a structure of the character set forth having a vertical standard, a work table slidably and rotatably mounted thereon, a support longitudinally shiftable on said standard toward and away from said table, a pressure fluid power cylinder carried by said support, a fluid conduit connected to said cylinder, said cylinder being provided with a piston and a plunger secured thereto, and a pressure member carried by said plunger and being rotatable and movable longitudinally toward said table.

3. In combination with a structure of the character set forth providing a vertical standard, a work table slidably mounted thereon, a support longitudinally shiftable on said standard toward and away from said table, a shaft rotatably and shiftably carried by said support, a fluid pressure cylinder carried by said shaft, means for supplying a fluid pressure to said cylinder, a plunger driven by said cylinder, and a pressure member fixed to said plunger and adapted to be moved toward and away from said table.

4. In combination with a drill press having a vertical standard, a work table shiftably mounted thereon, a support longitudinally shiftable on said standard, a shaft rotatably mounted in said support, a fluid pressure cylinder carried by the forward end of said shaft, a plunger driven by said cylinder, means for supplying a pressure fluid to said cylinder, and a pressure member comprising a hub receiving said plunger and a forwardly-extending foot adapted to be brought down upon the work on the table.

5. In combination with a drill press having a vertical standard, a work table shiftably and rotatably mounted thereon a support longitudinally shiftable on said standard and rotatable thereon, a shaft longitudinally mounted in said support and rotatable therein, a clamping member to permit release of said shaft to permit movement thereof, a pressure fluid cylinder carried by said shaft at the forward end thereof, means for supplying pressure fluid to said cylinder, a plunger driven by said cylinder, and a pressure member carried by said plunger and having a forwardly-extending portion adapted to engage the work on said table.

6. In combination with a drill press having a vertical standard, a work table shiftably mounted thereon, a support longitudinally shiftable on said standard toward and away from said table, a shaft carried by said support, clamping means for releasably securing said shaft upon said support and permitting, when loosened, the longitudinal shifting and rotation of said shaft, a pressure fluid cylinder carried by said shaft, means for supplying a pressure fluid to said cylinder, a piston within said cylinder, a plunger secured to said piston, and a pressure foot secured to said plunger and having a narrow forwardly-extending portion adapted to engage the work on said table.

7. In combination with a drill press having a standard extending upwardly therefrom, a work table shiftably mounted thereon, a support releasably secured to said standard and shiftable longitudinally thereof, a shaft movably carried in said support and a pneumatic cylinder carried by said shaft at the forward end thereof, means for supplying air under pressure to said cylinder, a piston within said cylinder, a plunger driven by said piston, and a pressure-applying member secured to said plunger and adapted to engage the work on said table.

THEODORE E. MEAD.